US012132278B2

United States Patent
Chen et al.

(10) Patent No.: US 12,132,278 B2
(45) Date of Patent: Oct. 29, 2024

(54) UNLOCKING CIRCUIT FOR CHARGING STATION WHEN POWERED OFF

(71) Applicant: Sungrow Power Supply Co., Ltd., Hefei (CN)

(72) Inventors: Xin Chen, Anhui (CN); Yuefeng Yang, Anhui (CN); Linchong Xu, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 557 days.

(21) Appl. No.: 17/380,108

(22) Filed: Jul. 20, 2021

(65) Prior Publication Data

US 2022/0131317 A1 Apr. 28, 2022

(30) Foreign Application Priority Data

Oct. 26, 2020 (CN) .......................... 202011157102.6

(51) Int. Cl.
*B60L 53/16* (2019.01)
*H01R 13/639* (2006.01)
*H01R 13/70* (2006.01)

(52) U.S. Cl.
CPC ............ *H01R 13/639* (2013.01); *B60L 53/16* (2019.02); *H01R 13/70* (2013.01); *H01R 2201/26* (2013.01)

(58) Field of Classification Search
CPC .. H01R 13/639; H01R 13/70; H01R 2201/26; B60L 53/16
See application file for complete search history.

(56) References Cited

U.S. PATENT DOCUMENTS

| 9,424,697 B2 | 8/2016 | Wu et al. |
| 2012/0129378 A1 | 5/2012 | Kiko et al. |
| 2014/0211345 A1 | 7/2014 | Thompason et al. |
| 2016/0072341 A1* | 3/2016 | Tamura ................... H02J 9/061 |
| | | 307/66 |

FOREIGN PATENT DOCUMENTS

| CN | 104936817 A | 9/2015 |
| CN | 106385093 A | 2/2017 |
| CN | 107323278 A | 11/2017 |

(Continued)

OTHER PUBLICATIONS

Extended European Search Report for European Application No. 21188354.1, dated Jan. 27, 2022.

(Continued)

*Primary Examiner* — Robert Grant
(74) *Attorney, Agent, or Firm* — Wolf, Greenfield & Sacks, P.C.

(57) ABSTRACT

An unlocking circuit for a charging station when powered off is provided. A microcontroller unit outputs a first level signal and a second level signal when an auxiliary power supply is cut off. A first signal processing circuit receives the first level signal and converts the first level signal into a first control signal for unlocking an electronic lock. A second signal processing circuit receives the second level signal and converts the second level signal into a second control signal including information about action effectiveness of the electronic lock. An action execution circuit receives the first control signal and the second control signal, and responds to the first control signal and the second control signal to unlock the electronic lock.

16 Claims, 4 Drawing Sheets

(56) References Cited

FOREIGN PATENT DOCUMENTS

| | | | |
|---|---|---|---|
| CN | 110014963 | A | 7/2018 |
| CN | 108621811 | A | 10/2018 |
| CN | 110341511 | A | 10/2019 |
| CN | 110395140 | A | 11/2019 |
| JP | 2012-005226 | A | 1/2012 |
| JP | 2018-191451 | A | 11/2018 |

OTHER PUBLICATIONS

First Office Action for Chinese Application No. 202011157102.6, dated Oct. 29, 2021.

\* cited by examiner

UNLOCKING CIRCUIT FOR CHARGING STATION WHEN POWERED OFF

The present application claims priority to Chinese Patent Application No. 202011157102.6, titled "UNLOCKING CIRCUIT FOR CHARGING STATION WHEN POWERED OFF", filed on Oct. 26, 2020 with the China National Intellectual Property Administration, which is incorporated herein by reference in its entirety.

FIELD

The present disclosure relates to the field of charging stations, and in particular to an unlocking circuit for a charging station when powered off.

BACKGROUND

An electronic lock is a locking device based on magnetic latching control in a direct current gun of a direct current charging station. A microcontroller unit (MCU) for the direct current charging station is usually powered by an auxiliary power supply. When the MCU controls to apply a positive pulse voltage to a coil in a control circuit module for the electronic lock, a locking bar of the electronic lock stretches out, so that the electronic lock is locked. When the MCU controls to apply a positive pulse voltage to the coil, the locking bar of the electronic lock retracts, so that the electronic lock is unlocked.

When the auxiliary power supply is cut off, a standby power supply supplies power to the MCU in order to unlock the electronic lock. In response to an MCU power failure signal detected by a power failure detection circuit, the MCU controls to apply a negative pulse voltage to the coil, so that the electronic lock is unlocked. However, in this case, the MCU is required to respond to the MCU power failure signal detected by the power failure detection circuit to perform unlocking control, resulting in complicated unlocking control logic when the auxiliary power supply is cut off.

SUMMARY

In view of this, an unlocking circuit for a charging station when powered off is provided in the present disclosure, in order to solve the problem of complicated unlocking control logic when a power supply for the MCU is cut off.

To solve the above technical problem, the following technical solutions are provided according to the present disclosure.

An unlocking circuit for a charging station when powered off includes a first signal processing circuit, a second signal processing circuit, and an action execution circuit. The first signal processing circuit is configured to: receive a first level signal outputted by a first output control terminal of a microcontroller unit when an auxiliary power supply of the charging station is cut off; and generate, based on to the first level signal, a first control signal for unlocking an electronic lock. The second signal processing circuit is configured to: receive a second level signal outputted by a second output control terminal of the microcontroller unit when the auxiliary power supply is cut off; and generate, based on the second level signal, a second control signal, wherein the second control signal comprises information about action effectiveness of the electronic lock. The action execution circuit is configured to receive the first control signal and the second control signal, and respond to the first control signal and the second control signal to unlock the electronic lock.

In an embodiment, the first signal processing circuit includes a first switch module and a first diode. A control terminal of the first switch module is connected to the first output control terminal of the microcontroller unit. An output terminal of the first switch module is grounded. An input terminal of the first switch module is connected to the action execution circuit and an anode of the first diode. A cathode of the first diode is connected to a positive electrode of the auxiliary power supply. When the first level signal is received by the control terminal of the first switch module, the first switch module is switched off. An electrical signal at the input terminal of the first switch module serves as the first control signal for unlocking the electronic lock.

In an embodiment, the first switch module includes a first current-limiting resistor, a first pull-down resistor, and a first switch. A control terminal of the first switch is connected to the first output control terminal of the microcontroller unit via the first current-limiting resistor, and is grounded via the first pull-down resistor. An output terminal of the first switch is grounded. An input terminal of the first switch is connected to the action execution circuit and the anode of the first diode.

In an embodiment, the second signal processing circuit includes a control module and a second switch module. An input terminal of the control terminal is connected to the second output control terminal of the microcontroller unit. An output terminal of the control terminal is connected to a control terminal of the second switch module. An output terminal of the second switch module is grounded. An input terminal of the second switch module is connected to the action execution circuit. When the second level signal is received, the control module outputs a signal for switching on the second switch module, to switch on the second switch module, where a ground signal serves as the second control signal comprising information about action effectiveness of the electronic lock.

In an embodiment, the control module includes a third switch module, a fourth switch module, a first voltage-dividing resistor, and a second voltage-dividing resistor. A control terminal of the third switch module is connected to the second output control terminal of the microcontroller unit. An output terminal of the third switch module is grounded. An input terminal of the third switch module is connected to the positive electrode of the auxiliary power supply via the first voltage-dividing resistor. A control terminal of the fourth switch module is connected to the input terminal of the third switch module and a terminal of the first voltage-dividing that is not connected to the positive electrode of the auxiliary power supply. An input terminal of the fourth switch module is connected to a negative electrode of the auxiliary power supply via the second voltage-dividing resistor. A first terminal of a first capacitor and a first terminal of a second capacitor are connected to the negative electrode of the auxiliary power supply. A second terminal of the first capacitor and a second terminal of the second capacitor are grounded. An anode of a second diode is connected to the positive electrode of the auxiliary power supply. A cathode of the second diode is connected to the negative electrode of the auxiliary power supply, the first terminal of the first capacitor and the first terminal of the second capacitor. An output terminal of the fourth switch module is grounded.

In an embodiment, the third switch module includes a second current-limiting resistor, a second pull-down resistor, and a third switch. A control terminal of the third switch is connected to the second output control terminal of the microcontroller unit via the second current-limiting resistor, and is grounded via the second pull-down resistor. An output terminal of the third switch is grounded. An input terminal of the third switch is connected to the positive electrode of the auxiliary power supply via the first voltage-dividing resistor.

In an embodiment, the fourth switch module includes a third current-limiting resistor, a third pull-down resistor, and a fourth switch. A control terminal of the fourth switch is connected to, via the third current-limiting resistor, the input terminal of the third switch and a terminal of the first voltage-dividing resistor that is not connected to the positive electrode of the auxiliary power supply. The control terminal of the fourth switch is grounded via the third pull-down resistor. An output terminal of the fourth switch is grounded. An input terminal of the fourth switch is connected to the negative electrode of the auxiliary power supply via the second voltage-dividing resistor.

In an embodiment, the second switch module includes a fourth current-limiting resistor, a fourth pull-down resistor, and a second switch. A control terminal of the second switch is connected to, via the fourth current-limiting resistor, the input terminal of the fourth switch and a terminal of the second voltage-dividing resistor that is not connected to the negative electrode of the auxiliary power supply. The control terminal of the second switch is grounded via the fourth pull-down resistor. An output terminal of the second switch is grounded. An input terminal of the second switch is connected to the action execution circuit.

In an embodiment, the action execution circuit includes a double-pole double-throw relay and a voltage stabilizing-filtering circuit. A first terminal of a coil of the double-pole double-throw relay is connected to the positive electrode of the auxiliary power supply, a second terminal of the coil is connected to the input terminal of the first switch and the anode of the first diode. A first common contact of the double-pole double-throw relay serves as a first control output terminal, and a second common contact of the double-pole double-throw relay serves as a second control output terminal. An end of the voltage stabilizing-filtering circuit is connected to the first common contact, and another end of the voltage stabilizing-filtering circuit is connected to the second common contact. A first fixed contact for connecting the first common contact and a fourth fixed contact for connecting the second common contact are connected to the input terminal of the second switch. A second fixed contact for connecting the first common contact is connected to the positive electrode of the auxiliary power supply and the terminal of the first coil of the double-pole double-throw relay. A third fixed contact for connecting the second common contact is connected to the negative electrode of the auxiliary power supply. When the first control signal and the second control signal are received by the double-pole double-throw relay, the first common contact and the second common contact do not operate, a voltage difference between the first control output terminal and the second control output terminal is negative, and a negative voltage pulse is outputted to unlock the electronic lock.

In an embodiment, the voltage stabilizing-filtering circuit includes a Zener diode, a filter capacitor, and a filter resistor. A first terminal of the Zener diode, a first terminal of the filter capacitor, and a first terminal of the filter resistor are connected to the first common contact. A second terminal of the Zener diode, a second terminal of the filter capacitor, and a second terminal of the filter resistor are connected to the second common contact.

In an embodiment, both the first level signal and the second level signal are low level signals.

In addition, an electronic lock control circuit module is provided, which includes the unlocking circuit for a charging station when powered off as described above.

In addition, a charging device is further provided, which includes the electronic lock control circuit module and a microcontroller unit. A first output control terminal of the microcontroller unit and a second output control terminal of the microcontroller unit are connected to the electronic lock control circuit module.

In an embodiment, the charging device further includes an electronic lock state acquisition module. The electronic lock state acquisition module is connected to the microcontroller unit and a charging gun.

In addition, a charging station is further provided, which includes the charging device.

Compared with the conventional technology, the present disclosure has the following advantageous effects. An unlocking circuit for a charging station when powered off is provided in the present disclosure. According to the present disclosure, a microcontroller unit outputs a first level signal and a second level signal when an auxiliary power supply is cut off. A first signal processing circuit receives the first level signal and converts the first level signal into a first control signal for unlocking an electronic lock. A second signal processing circuit receives the second level signal and converts the second level signal into a second control signal including information about action effectiveness of the electronic lock. The action execution circuit receives the first control signal and the second control signal, and responds to the first control signal and the second control signal to unlock the electronic lock. According to the present disclosure, the unlocking circuit for a charging station when powered off responds to the first level signal and the second level signal that are outputted by the microcontroller unit when the auxiliary power supply is cut off, so as to unlock the electronic lock. No standby power supply is required to supply power to the MCU and no power failure detection circuit is required to detect the MCU power failure signal, thereby simplifying the unlocking control logic in the case that the auxiliary power supply is cut off. Furthermore, since no power failure detection circuit and no standby power supply are required in the present disclosure, cost is reduced, connection of a circuit board is simplified, and there is no need to provide area on the circuit board for the power failure detection circuit and the standby power supply.

BRIEF DESCRIPTION OF THE DRAWINGS

In order for clearer illustration of technical solutions in embodiments of the present disclosure or in the conventional technology, the drawings to be used in the description of the embodiments or the conventional technology are briefly described below. Apparently, the drawings in the following description show only embodiments of the present disclosure, and those skilled in the art may obtain other drawings from the drawings without any creative effort.

DETAILED DESCRIPTION

The technical solutions in the embodiments of the present disclosure are clearly and completely described below with reference to the accompanying drawings in the embodiments of the present disclosure. Apparently, the embodiments described herein are only a part rather than all of the embodiments of the present disclosure. Any other embodiments obtained by those skilled in the art based on the embodiments in the present disclosure without any creative effort shall fall within the protection scope of the present disclosure.

After a power supply for an MCU is cut off, the MCU is powered by a standby power supply in order to unlock an electronic lock. In response to an MCU power failure signal detected by a power failure detection circuit, the MCU controls an electronic lock control circuit module to output a negative pulse voltage signal to excite a coil of the electronic lock, so as to unlock the electronic lock. However, in this case, the MCU is required to respond to the MCU power failure signal detected by the power failure detection circuit to perform unlocking control, resulting in complicated unlocking control logic when a power supply for the MCU is cut off.

In order to solve the above-mentioned problem of complicated unlocking control logic after a power supply is cut off, it is found from studies that, in a case that a structure of the electronic lock control circuit module is improved, the electronic lock control circuit module automatically controls to unlock the electronic lock after the auxiliary power supply is cut off, the power failure detection circuit and the standby power supply are no longer required, thereby simplifying the unlocking control logic after a power supply is cut off.

In view of this, an unlocking circuit for a charging station when powered off, that is, an implementation of the electronic lock control circuit module, is provided in the present disclosure. Before illustrating the implementation of the electronic lock control circuit module, a scenario in which the electronic lock control circuit module is applied is described.

Figure 1:
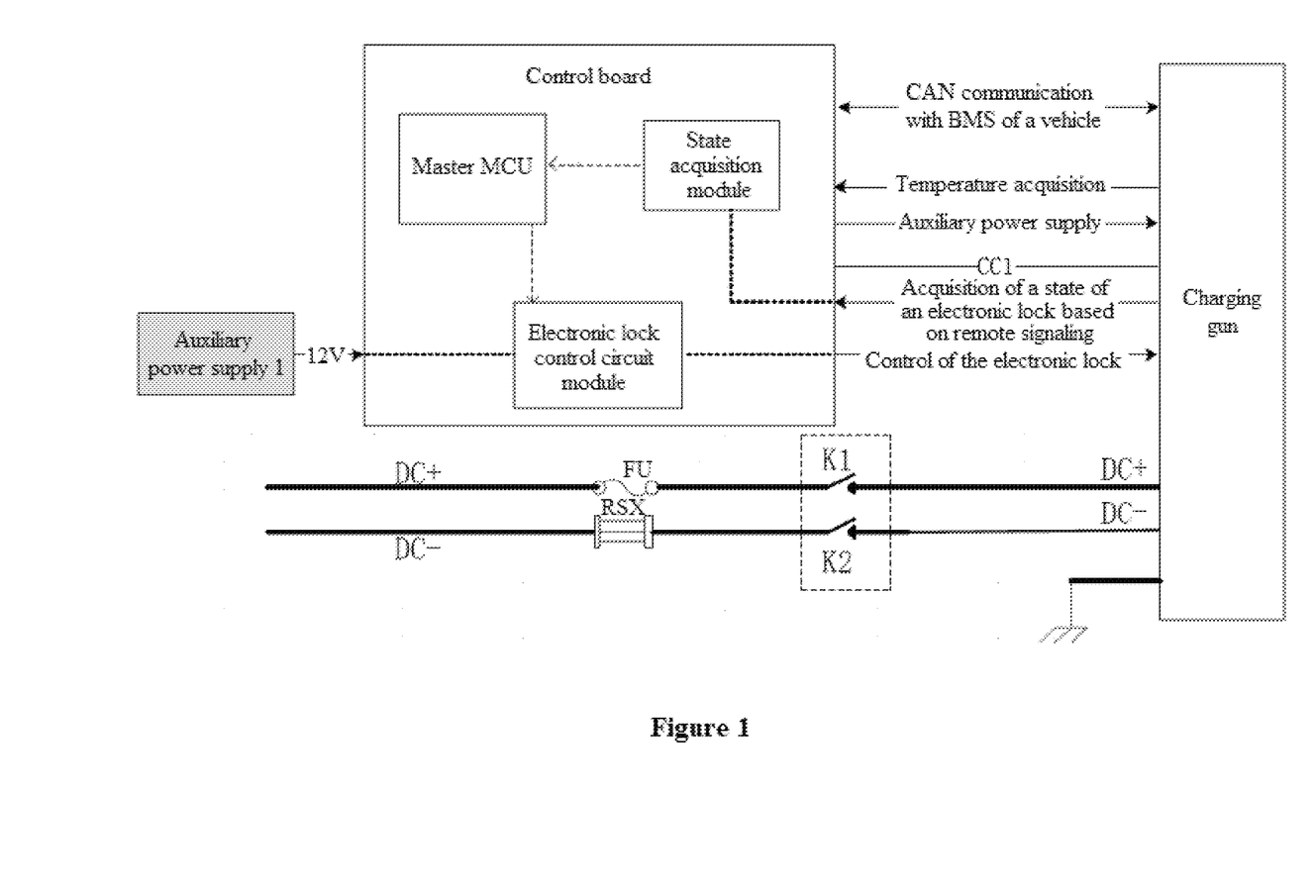
FIG. 1 is a schematic diagram showing a scenario for an unlocking circuit for a charging station when powered off according to an embodiment of the present disclosure.

Referring to FIG. 1, when a direct current charging station operates normally, an auxiliary power supply 1 supplies power to a control board. An MCU 14 of the control board controls the electronic lock control circuit module to output a positive pulse voltage signal or a negative pulse voltage signal, so as to lock or unlock an electronic lock 15 in a charging gun of the charging station. Further, an electronic lock state acquisition module acquires a state of the electronic lock 15 based on remote signaling with the charging gun, and transmits the state of the electronic lock 15 to the MCU. The MCU receives the state of the electronic lock 15 to determine whether the electronic lock 15 is unlocked or locked. When a power supply at an alternating current input side of the direct current charging station is cut off, the electronic lock control circuit module automatically controls to unlock the electronic lock 15.

The control board is configured to perform CAN communication with a battery management system BMS of a vehicle via the charging gun, and is further configured to acquire a temperature of the charging gun, control a voltage output signal CC1 in the charging gun of the direct current charging station, and control power from the auxiliary power supply, and so on.

In practical applications, referring to FIG. 1, an electrical signal DC+ is outputted via a branch including a fuse FU and a relay K1, and an electrical signal DC− is outputted via a branch including a shunt RSX and a relay K2, so as to supply a high voltage to the charging gun.

Figure 2:
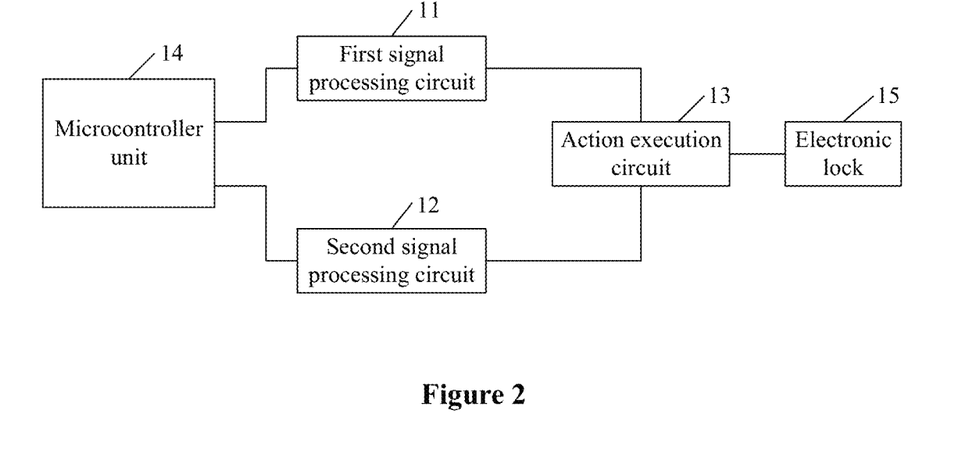
FIG. 2 is a schematic structural diagram of an unlocking circuit for a charging station when powered off according to an embodiment of the present disclosure.

The scenario in which the electronic lock control circuit module is applied is described above. Hereinafter, the implementation of the electronic lock control circuit module, that is, the unlocking circuit for a charging station when powered off according to an embodiment of the present disclosure is described. Referring to FIG. 2, the unlocking circuit includes a first signal processing circuit 11, a second signal processing circuit 12, and an action execution circuit 13.

The first signal processing circuit 11 is configured to: receive a first level signal output by a first output control terminal of a microcontroller unit 14 when an auxiliary power supply of the charging station is cut off; and generate, based on the first level signal, a first control signal for unlocking an electronic lock.

The second signal processing circuit 12 is configured to: receive a second level signal output by a second output control terminal of the microcontroller unit 14 when the auxiliary power supply is cut off, and generate, based on the second level signal, a second control signal including information about action effectiveness of the electronic lock.

The action execution circuit 13 is configured to receive the first control signal and the second control signal, and respond to the first control signal and the second control signal to unlock the electronic lock.

In practical applications, both the first level signal and the second level signal are low level signals. In the case that the auxiliary power supply is cut off, voltages at both the first output control terminal and the second output control terminal of the microcontroller unit 14 are at a low level. Therefore, the first output control terminal and the second output control terminal each output a low level signal, that is, the first level signal and the second level signal.

The first signal processing circuit 11 receives the first level signal and converts the first level signal into a first control signal for unlocking the electronic lock. The second signal processing circuit 12 receives the second level signal and converts the second level signal into a second control signal including information about action effectiveness of the electronic lock. The action execution circuit 13 receives the first control signal and the second control signal, and responds to the first control signal and the second control signal to unlock the electronic lock 15. According to the present disclosure, the unlocking circuit for a charging station when powered off responds to the first level signal and the second level signal that are outputted by the microcontroller unit when the auxiliary power supply is cut off, so as to unlock the electronic lock 15.

In this embodiment, no standby power supply is required to supply power to the MCU and no power failure detection circuit is required to detect the MCU power failure signal, thereby simplifying the unlocking control logic in the case that the auxiliary power supply is cut off. Furthermore, since no power failure detection circuit and no standby power supply are required in the present disclosure, cost is reduced, connection of a circuit board is simplified, and there is no need to provide area on the circuit board for the power failure detection circuit and the standby power supply.

A main structure of the unlocking circuit for a charging station when powered off is described in the above embodiment. Hereinafter, a structure of each of the first signal processing circuit 11, the second signal processing circuit 12 and the action execution circuit 13 in the unlocking circuit for a charging station when powered off is described.

Figure 3:
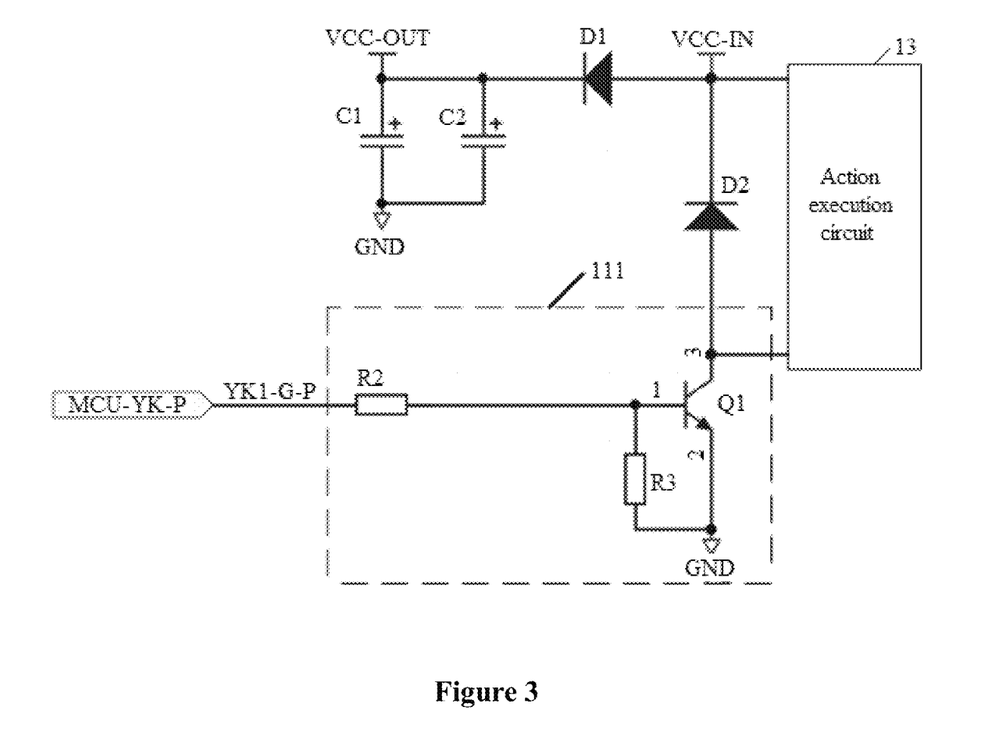
FIG. 3 is a schematic structural diagram of an unlocking circuit for a charging station when powered off according to another embodiment of the present disclosure.

Referring to FIG. 3, the first signal processing circuit 11 includes a first switch module 111 and a first diode D2.

A control terminal of the first switch module 111 is connected to a first output control terminal MCU-YK-P of the microcontroller unit 14. An output terminal of the first switch module 111 is connected to the ground GND. An input terminal of the first switch module 111 is connected to the action execution circuit 13 and an anode of the first diode D2. A cathode of the first diode D2 is connected to a positive electrode VCC-IN of the auxiliary power supply.

The first switch module 111 includes a first current-limiting resistor R2, a first pull-down resistor R3, and a first switch Q1.

A control terminal 1 of the first switch Q1 is connected to the first output control terminal MCU-YK-P of the microcontroller unit 14 via the first current-limiting resistor R2. The control terminal 1 of the first switch Q1 is connected to the ground GND via the first pull-down resistor R3. An output terminal 2 of the first switch Q1 is connected to the ground GND. An input terminal 3 of the first switch Q1 is connected to the action execution circuit 13 and the anode of the first diode D2.

In practical applications, the first switch module 111 is switched on at a high voltage. The first output control terminal MCU-YK-P of the MCU outputs a first low level signal YK1-G-P when the auxiliary power supply of the charging station is cut off. In this case, the first low level signal is received by the control terminal of the first switch module 111, so that the first switch module 111 is switched off. Specifically, the first switch Q1 is switched off. The input terminal of the first switch module 111, that is, the input terminal 3 of the first switch Q1, generates a low level signal, which serves as the first control signal for unlocking the electronic lock.

Figure 4:
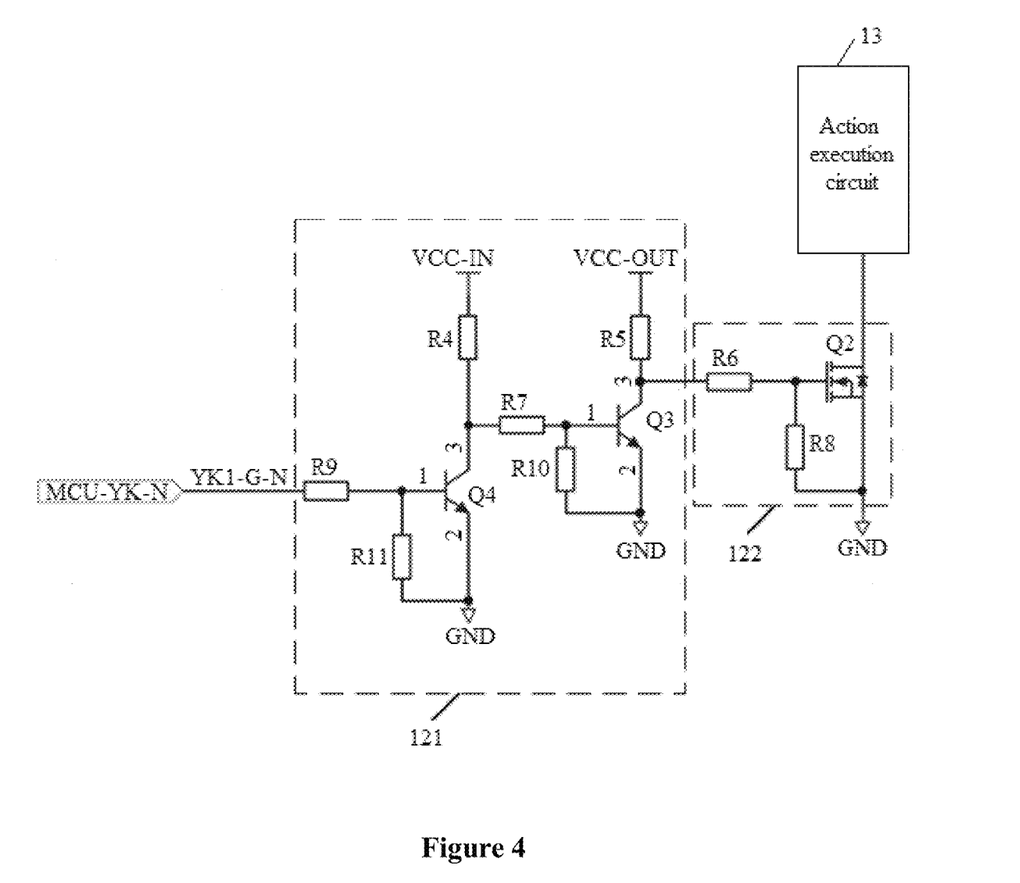
FIG. 4 is a schematic structural diagram of an unlocking circuit for a charging station when powered off according to another embodiment of the present disclosure.
Figure 5:
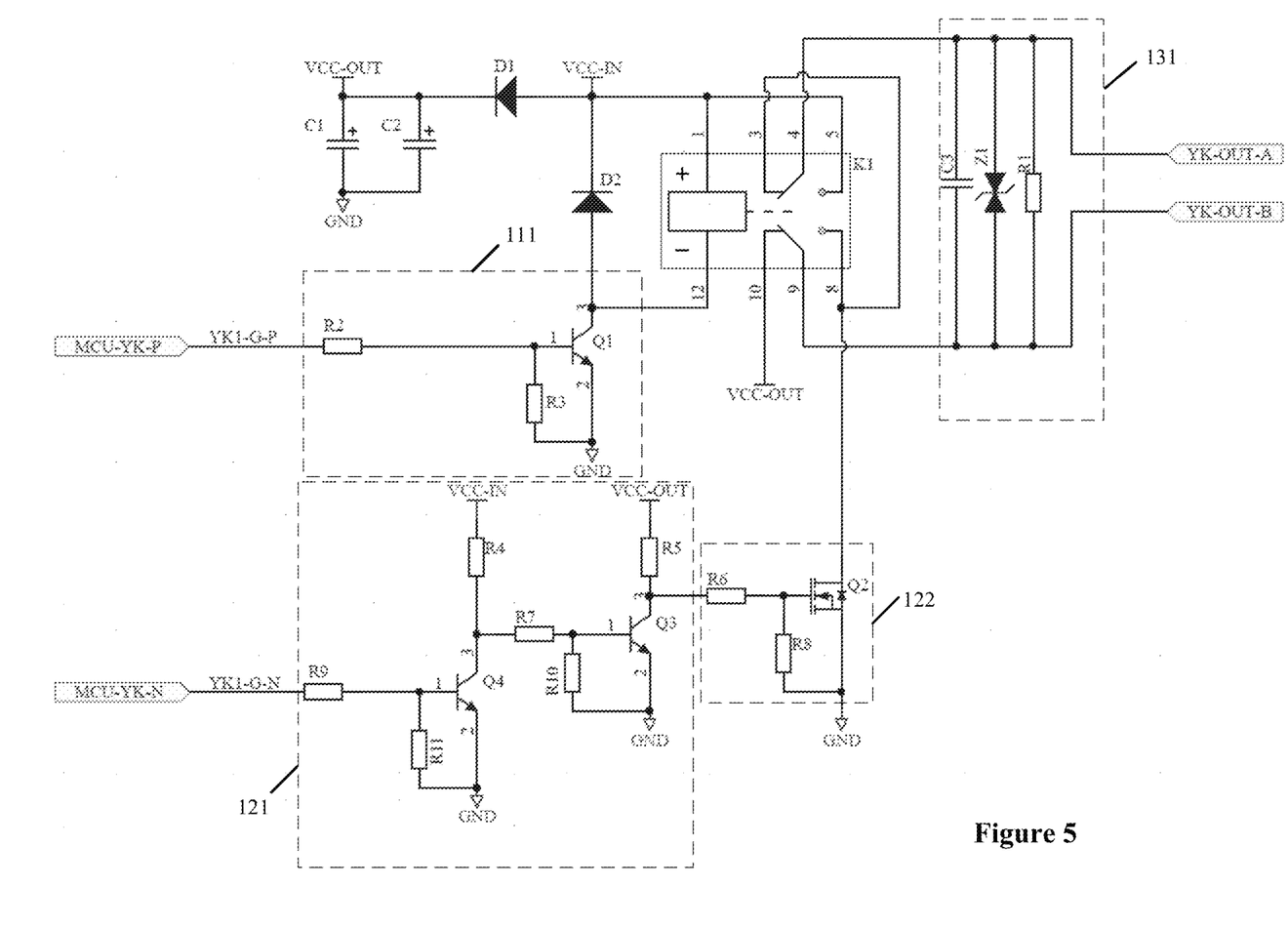
FIG. 5 is a schematic structural diagram of an unlocking circuit for a charging station when powered off according to another embodiment of the present disclosure.

Referring to FIG. 4 and FIG. 5, the second signal processing circuit 12 includes a control module 121 and a second switch module 122.

An input terminal of the control module 121 is connected to a second output control terminal MCU-YK-N of the microcontroller unit 14. An output terminal of the control module 121 is connected to a control terminal of the second switch module 122. An input terminal of the second switch module 122 is connected to the ground GND. An input terminal of the second switch module 122 is connected to the action execution circuit 13.

The control module 121 includes a third switch module, a fourth switch module, a first voltage-dividing resistor R4 and a second voltage-dividing resistor R5.

A control terminal of the third switch module is connected to the second output control terminal MCU-YK-N of the microcontroller unit 14. An output terminal of the third switch module is connected to the ground GND. An input terminal of the third switch module is connected to the positive electrode VCC-IN of the power supply via the first voltage-dividing resistor R4.

A control terminal of the fourth switch module is connected to the input terminal of the third switch module and a terminal of the first voltage-dividing resistor R4 that is not connected to the positive electrode VCC-IN of the auxiliary power supply. An input terminal of the fourth switch module is connected to a negative electrode VCC-OUT of the auxiliary power supply via the second voltage-dividing resistor R5. A first terminal of a first capacitor C1 and a first terminal of a second capacitor C2 are connected to the negative electrode VCC-OUT of the auxiliary power supply. A second terminal of the first capacitor C1 and a second terminal of the second capacitor C2 are connected to the ground GND. An anode of a second diode D1 is connected to the positive electrode VCC-IN of the auxiliary power supply. A cathode of the second diode D1 is connected to the negative electrode VCC-OUT of the auxiliary power supply, the first terminal of the first capacitor C1 and the first terminal of the second capacitor C2. An output terminal of the fourth switch module is connected to the ground GND.

The third switch module includes a second current-limiting resistor R9, a second pull-down resistor R11, and a third switch Q4.

A control terminal 1 of the third switch Q4 is connected to the second output control terminal MCU-YK-N of the microcontroller unit 14 via the second current-limiting resistor R9. The control terminal 1 of the third switch Q4 is connected to the ground GND via the second pull-down resistor R11. An output terminal 2 of the third switch Q4 is connected to the ground GND. An input terminal 3 of the third switch Q4 is connected to the positive electrode VCC-IN of the auxiliary power supply via the first voltage-dividing resistor R4.

The fourth switch module includes a third current-limiting resistor R7, a third pull-down resistor R10, and a fourth switch Q3.

A control terminal 1 of the fourth switch Q3 is connected to, via the third current-limiting resistor R7, the input terminal 3 of the third switch Q4 and a terminal of the first voltage-dividing resistor R4 that is not connected to the positive electrode VCC-IN of the power supply. The control terminal 1 of the fourth switch Q3 is connected to the ground GND via the third pull-down resistor R10. An output terminal 2 of the fourth switch Q3 is connected to the ground GND. An input terminal 3 of the fourth switch Q3 is connected to the negative electrode VCC-OUT of the auxiliary power supply via the second voltage-dividing resistor R5.

The second switch module 122 includes a fourth current-limiting resistor R6, a fourth pull-down resistor R8, and a second switch Q2.

A control terminal of the second switch Q2 is connected to, via the fourth current-limiting resistor R6, the input terminal 3 of the fourth switch Q3 and a terminal of the second voltage-dividing resistor R5 that is not connected to the negative electrode VCC-OUT of the auxiliary power supply. The control terminal of the second switch Q2 is connected to the ground GND via the fourth pull-down resistor R6. An output terminal of the second switch Q2 is connected to the ground GND. An input terminal of the second switch Q2 is connected to the action execution circuit 13.

Based on the second signal processing circuit 12, the control module 122 receives a second level signal YK1-G-N outputted by the second output control terminal MCU-YK-N of the microcontroller unit 14 when the auxiliary power supply of the charging station is cut off, and outputs a signal for switching on the second switching module 122. The second switch module 122 is switched on, so that a ground signal serves as a second control signal including information about the action effectiveness of the electronic lock.

Specifically, the control module 121 receives the second level signal, that is, the second low level signal YK1-G-P, outputted by the second output control terminal MCU-YK-N of the microcontroller unit 14 when the auxiliary power supply of the charging station is cut off. The control terminal of the third switch Q4 that is switched on at a high level receives a low level signal, so that the third switch Q4 is switched off. In this case, the control terminal of the fourth switch Q3 receives a low level signal, so that the fourth switch Q3 is switched off. The control terminal of the second switch Q2 receives a high level signal, so that the second switch Q2 is switched on. An electrical signal at the input terminal of the second switch Q2 is a ground signal, and the ground signal is inputted to the action execution circuit 13. The ground signal serves as the second control signal including the information about the action effectiveness of the electronic lock.

Based on the above description, a structure of the action execution circuit 13 is illustrated below. Referring to FIG. 5, the action execution circuit 13 includes a double-pole double-throw relay K1 and a voltage stabilizing-filtering circuit 131.

A terminal 1 of a coil of the double-pole double-throw relay K1 is connected to the positive electrode VCC-IN of the auxiliary power supply. Another terminal 12 of the coil is connected to the input terminal 3 of the first switch Q1 and the anode of the first diode D2.

A first common contact 4 of the double-pole double-throw relay K1 serves as a first control output terminal YK-OUT-A, and a second common contact 9 of the double-pole double-throw relay K1 serves as a second control output terminal YK-OUT-B. A terminal of the voltage stabilizing-filtering circuit 131 is connected to the first common contact 4, and another terminal of the voltage stabilizing-filtering circuit 131 is connected to the second common contact 9.

A first fixed contact 3 for connecting the first common contact 4 and a fourth fixed contact 8 for connecting the second common contact 9 are connected to the input terminal of the second switch Q2. A second fixed contact 5 for connecting the first common contact 4 is connected to the positive electrode VCC-IN of the auxiliary power supply and the terminal 1 of the coil of the double-pole double-throw relay K1. A third fixed contact 10 for connecting the second common contact 9 is connected to the negative electrode VCC-OUT of the auxiliary power supply.

When the double-pole double-throw relay K1 receives the first control signal and the second control signal, the first common contact 4 and the second common contact 9 do not operate. The first common contact 4 is grounded and has a low level signal. The second common contact 9 is connected to the negative electrode VCC-OUT of the auxiliary power supply and has a high level signal. In this case, a voltage difference between the first control output terminal and the second control output terminal is negative. A negative voltage pulse is outputted to the charging gun for unlocking the electronic lock 15.

In addition, the voltage stabilizing-filtering circuit 131 includes a Zener diode Z1, a filter capacitor C3, and a filter resistor R1. A first terminal of the Zener diode Z1, a first terminal of the filter capacitor C3, and a first terminal of the filter resistor R1 are connected to the first common contact 4. A second terminal of the Zener diode Z1, a second terminal of the filter capacitor C3, and a second terminal of the filter resistor R1 are connected to the second common contact 9.

The structures of the first signal processing circuit 11, the second signal processing circuit 12, and the action execution circuit 13 are described above. Hereinafter, a control process according to the present disclosure is described. Specifically, referring to FIG. 2, the positive electrode VCC-IN of the auxiliary power supply supplies power to the unlocking circuit. VCC-OUT indicates a voltage across an electrolytic capacitor. K1 represents a double-pole double-throw relay. MCU-YK-P and MCU-YK-N represent control signals outputted by an MCU. YK-OUT-A and YK-OUT-B represent output control terminals connected to a cable package for controlling the electronic lock. In a case that a voltage difference between YK-OUT-A and YK-OUT-B is negative, a negative voltage pulse is outputted to unlock the electronic lock 15. In a case that the voltage difference between YK-OUT-A and YK-OUT-B is positive, a positive voltage pulse is outputted to lock the electronic lock 15.

When the direct current charging station operates normally, in a case that both control signals MCU-YK-P and MCU-YK-N outputted by the MCU are at a high level, the electronic lock 15 is controlled to be locked. In a case that control signal MCU-YK-P is at a low level and the control signal MCU-YK-N is at a high level, the electronic lock 15 is controlled to be unlocked. In a case that both control signals MCU-YK-P and MCU-YK-N are at a low level, the electronic lock 15 do not operate. When the charging station is powered on for the first time, the output end of the MCU has high-impedance, so that control signals MCU-YK-P and MCU-YK-N outputted by the MCU are at a low level. Therefore, the electronic lock 15 do not operate.

When a power supply at an alternating current input side of the direct current charging station is cut off, that is, when the auxiliary power supply of the charging station is cut off, the MCU is powered off, so that both control signals MCU-YK-P and MCU-YK-N are at a low level. The positive electrode VCC-IN of the auxiliary power supply is cut off. For the double-pole double-throw relay K1, the first common contact 4 is connected to the first fixed contact 3, and the second common contact 9 is connected to the third fixed contact 10. The third switch Q4 and the fourth switch Q3 are switched off. The second switch Q2 is switched on. In this case, a voltage difference between output control terminals YK-OUT-A and YK-OUT-B is equal to the voltage across the electrolytic capacitor. That is, a negative voltage pulse is outputted to the electronic lock 15, to unlock the electronic lock 15. Because of a limited capability of the electrolytic capacitor, the negative voltage pulse is outputted to unlock the electronic lock 15.

In this embodiment, no power failure detection circuit is required. When the power supply at the alternating current input side of the direct current charging station is cut off, a power supply of 12V for powering the control board is cut off. Cut-off of the power supply of 12V triggers the unlocking circuit. The unlocking circuit automatically triggers unlocking circuit logic and outputs a signal to unlock the electronic lock. Therefore, the unlocking circuit automatically controls the electronic lock 15 to be unlocked without control of the MCU. Only an ordinary electrolytic capacitor serves as the power supply for driving the electronic lock 15, having advantages of low cost, convenient production and small printed circuit board (PCB).

Based on the unlocking circuit for a charging station when powered off, an electronic lock control circuit module is further provided according to another embodiment of the present disclosure. The electronic lock control circuit module includes the unlocking circuit for a charging station when powered off.

Based on the electronic lock control circuit module, a charging device is further provided according to another embodiment of the present disclosure. The charging device includes the electronic lock control circuit module and a microcontroller unit. A first output control terminal and a second output control terminal of the microcontroller unit are connected to the electronic lock control circuit module. Reference may be made to FIG. 1 to FIG. 5 for specific connection thereof.

In a case that the microcontroller unit is powered by a power supply, the electronic lock control circuit module is controlled by the microcontroller unit, to lock or unlock an electronic lock as required. When the microcontroller unit is powered off, the first output control terminal and the second output control terminal of the microcontroller unit output level signals. In response to the level signals, the electronic lock control circuit module is triggered to unlock the electronic lock.

Furthermore, the charging device further includes an electronic lock state acquisition module. The electronic lock state acquisition module is connected to the microcontroller unit and a charging gun.

The electronic lock state acquisition module is configured to acquire a state of the electronic lock based on remote signaling with the charging gun, and transmits the state of the electronic lock to the MCU. The MCU receives the state of the electronic lock to determine whether the electronic lock 15 is unlocked or locked. When a power supply at an alternating current input side of the direct current charging station is cut off, the electronic lock control circuit module automatically unlocks the electronic lock.

Based on the charging device, a charging station is further provided according to another embodiment of the present disclosure. The charging station includes a charging gun and the charging device.

The charging device is configured to charge the charging gun. The charging gun is connected to a vehicle, to control a charging process of the vehicle via the charging device.

It should be noted that, for structures and functions of the electronic lock control circuit module, the charging device, and the charging station according to the above embodiments, reference can be made to the description of the unlocking circuit for a charging station when powered off. Therefore, structures and functions of the electronic lock control circuit module, the charging device, and the charging station are not described in detail herein.

Based on the above description of the disclosed embodiments, those skilled in the art may implement or use the present disclosure. Many modifications to these embodiments are apparent for those skilled in the art. The general principles defined herein may be applied to other embodiments without departing from the spirit or scope of the present disclosure. Therefore, the present disclosure is not limited to the embodiments illustrated herein, but is to conform to the widest scope accordance with the principles and novel features disclosed herein.

The invention claimed is:

1. An unlocking circuit for a charging station when powered off, wherein the unlocking circuit comprises:
   a first signal processing circuit configured to: receive a first level signal outputted by a first output control terminal of a microcontroller unit when an auxiliary power supply of the charging station is cut off; and generate, based on the first level signal, a first control signal for unlocking an electronic lock;
   a second signal processing circuit configured to: receive a second level signal outputted by a second output control terminal of the microcontroller unit when the auxiliary power supply is cut off; and generate, based on the second level signal, a second control signal, wherein the second control signal comprises information about action effectiveness of the electronic lock; and
   an action execution circuit configured to receive the first control signal and the second control signal, and respond to the first control signal and the second control signal to unlock the electronic lock.

2. The unlocking circuit for a charging station when powered off according to claim 1, wherein the first signal processing circuit comprises a first switch module and a first diode, wherein
   a control terminal of the first switch module is connected to the first output control terminal of the microcontroller unit, an output terminal of the first switch module is grounded, an input terminal of the first switch module is connected to the action execution circuit and an anode of the first diode, and a cathode of the first diode is connected to a positive electrode of the auxiliary power supply; and
   when the first level signal is received by the control terminal of the first switch module, the first switch module is switched off, wherein an electrical signal at the input terminal of the first switch module serves as the first control signal for unlocking the electronic lock.

3. The unlocking circuit for a charging station when powered off according to claim 2, wherein the first switch module comprises a first current-limiting resistor, a first pull-down resistor, and a first switch, wherein
   a control terminal of the first switch is connected to the first output control terminal of the microcontroller unit via the first current-limiting resistor, and is grounded via the first pull-down resistor;
   an output terminal of the first switch is grounded; and
   an input terminal of the first switch is connected to the action execution circuit and the anode of the first diode.

4. The unlocking circuit for a charging station when powered off according to claim 3, wherein the second signal processing circuit comprises a control module and a second switch module, wherein
   an input terminal of the control module is connected to the second output control terminal of the microcontroller unit, and an output terminal of the control module is connected to a control terminal of the second switch module, an output terminal of the second switch module is grounded, and an input terminal of the second switch module is connected to the action execution circuit, and
   when the second level signal is received, the control module outputs a signal for switching on the second switch module, to switch on the second switch module, wherein a ground signal serves as the second control signal comprising information about action effectiveness of the electronic lock.

5. The unlocking circuit for a charging station when powered off according to claim 4, wherein the control module comprises a third switch module, a fourth switch module, a first voltage-dividing resistor, and a second voltage-dividing resistor, wherein
   a control terminal of the third switch module is connected to the second output control terminal of the microcontroller unit, an output terminal of the third switch module is grounded, and an input terminal of the third switch module is connected to the positive electrode of the auxiliary power supply via the first voltage-dividing resistor;
   a control terminal of the fourth switch module is connected to the input terminal of the third switch module and a terminal of the first voltage-dividing that is not connected to the positive electrode of the auxiliary power supply, an input terminal of the fourth switch module is connected to a negative electrode of the auxiliary power supply via the second voltage-dividing resistor;

a first terminal of a first capacitor and a first terminal of a second capacitor are connected to the negative electrode of the auxiliary power supply, and a second terminal of the first capacitor and a second terminal of the second capacitor are grounded;

an anode of a second diode is connected to the positive electrode of the auxiliary power supply;

a cathode of the second diode is connected to the negative electrode of the auxiliary power supply, the first terminal of the first capacitor and the first terminal of the second capacitor; and an output terminal of the fourth switch module is grounded.

6. The unlocking circuit for a charging station when powered off according to claim 5, wherein the third switch module comprises a second current-limiting resistor, a second pull-down resistor, and a third switch, wherein a control terminal of the third switch is connected to the second output control terminal of the microcontroller unit via the second current-limiting resistor, and is grounded via the second pull-down resistor;

an output terminal of the third switch is grounded; and an input terminal of the third switch is connected to the positive electrode of the auxiliary power supply via the first voltage-dividing resistor.

7. The unlocking circuit for a charging station when powered off according to claim 6, wherein the fourth switch module comprises a third current-limiting resistor, a third pull-down resistor, and a fourth switch, wherein a control terminal of the fourth switch is connected to, via the third current-limiting resistor, the input terminal of the third switch and a terminal of the first voltage-dividing resistor that is not connected to the positive electrode of the auxiliary power supply;

the control terminal of the fourth switch is grounded via the third pull-down resistor, an output terminal of the fourth switch is grounded, and an input terminal of the fourth switch is connected to the negative electrode of the auxiliary power supply via the second voltage-dividing resistor.

8. The unlocking circuit for a charging station when powered off according to claim 7, wherein the second switch module comprises a fourth current-limiting resistor, a fourth pull-down resistor, and a second switch, wherein a control terminal of the second switch is connected to, via the fourth current-limiting resistor, the input terminal of the fourth switch and a terminal of the second voltage-dividing resistor that is not connected to the negative electrode of the auxiliary power supply;

the control terminal of the second switch is grounded via the fourth pull-down resistor;

an output terminal of the second switch is grounded; and an input terminal of the second switch is connected to the action execution circuit.

9. The unlocking circuit for a charging station when powered off according to claim 8, wherein the action execution circuit comprises a double-pole double-throw relay and a voltage stabilizing-filtering circuit, wherein a first terminal of a coil of the double-pole double-throw relay is connected to the positive electrode of the auxiliary power supply, a second terminal of the coil is connected to the input terminal of the first switch and the anode of the first diode;

a first common contact of the double-pole double-throw relay serves as a first control output terminal, and a second common contact of the double-pole double-throw relay serves as a second control output terminal;

an end of the voltage stabilizing-filtering circuit is connected to the first common contact, and another end of the voltage stabilizing-filtering circuit is connected to the second common contact;

a first fixed contact for connecting the first common contact and a fourth fixed contact for connecting the second common contact are connected to the input terminal of the second switch;

a second fixed contact for connecting the first common contact is connected to the positive electrode of the auxiliary power supply and the first terminal of the coil of the double-pole double-throw relay;

a third fixed contact for connecting the second common contact is connected to the negative electrode of the auxiliary power supply; and when the first control signal and the second control signal are received by the double-pole double-throw relay, the first common contact and the second common contact do not operate, a voltage difference between the first control output terminal and the second control output terminal is negative, and a negative voltage pulse is outputted to unlock the electronic lock.

10. The unlocking circuit for a charging station when powered off according to claim 9, wherein the voltage stabilizing-filtering circuit comprises a Zener diode, a filter capacitor, and a filter resistor, wherein a first terminal of the Zener diode, a first terminal of the filter capacitor, and a first terminal of the filter resistor are connected to the first common contact; and a second terminal of the Zener diode, a second terminal of the filter capacitor, and a second terminal of the filter resistor are connected to the second common contact.

11. The unlocking circuit for a charging station when powered off according to claim 1, wherein both the first level signal and the second level signal are low level signals.

12. An electronic lock control circuit module, comprising the unlocking circuit for a charging station when powered off according to claim 1.

13. A charging device, comprising the electronic lock control circuit module according to claim 12 and a microcontroller unit, wherein a first output control terminal of the microcontroller unit and a second output control terminal of the microcontroller unit are connected to the electronic lock control circuit module.

14. The charging device according to claim 13, further comprising:

an electronic lock state acquisition module connected to the microcontroller unit and a charging gun.

15. A charging station, comprising:
a charging gun; and
the charging device according to claim 13.

16. A charging station, comprising:
a charging gun; and
the charging device according to claim 14.

* * * * *